United States Patent
Stolzer

(10) Patent No.: US 7,228,774 B2
(45) Date of Patent: Jun. 12, 2007

(54) ADJUSTABLE CLEAT

(75) Inventor: James Timothy Stolzer, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/686,476

(22) Filed: Oct. 15, 2003

(65) Prior Publication Data

US 2006/0101957 A1 May 18, 2006

Related U.S. Application Data

(63) Continuation of application No. 10/601,328, filed on Jun. 20, 2003, now abandoned.

(60) Provisional application No. 60/390,552, filed on Jun. 21, 2002.

(51) Int. Cl.
*B26D 7/02* (2006.01)
*B23Q 3/00* (2006.01)

(52) U.S. Cl. .................. 83/451; 83/468.6; 269/304; 269/315

(58) Field of Classification Search ................ 83/435.11–435.14, 581, 471.3, 473, 490, 83/761, 764–767, 759, 771, 468.5, 468.6, 83/451, 452, 465, 466; 269/303, 304, 319, 269/36, 86, 90, 180, 315; 403/329, 330, 403/325, DIG. 4, 9, 161, 162
See application file for complete search history.

(56) References Cited

U.S. PATENT DOCUMENTS

| | | | | |
|---|---|---|---|---|
| 234,797 A * | 11/1880 | Miller | ............... | 83/490 |
| 415,940 A | 11/1889 | Davis | | |
| 497,524 A * | 5/1893 | Loveall | ............... | 83/767 |
| 544,092 A * | 8/1895 | Goodell | ............... | 83/767 |
| 752,406 A | 2/1904 | Nichols | | |
| 888,430 A * | 5/1908 | Solemslie | ............... | 83/767 |
| 1,002,980 A * | 9/1911 | Fish | ............... | 83/767 |
| 1,147,063 A * | 7/1915 | Wilson | ............... | 83/767 |
| 1,155,912 A * | 10/1915 | Grabowsky | ............... | 83/767 |
| 1,233,083 A * | 7/1917 | McMillan | ............... | 83/766 |
| 1,745,099 A * | 1/1930 | Kasper | ............... | 83/761 |
| 1,798,342 A * | 3/1931 | Trepte | ............... | 269/303 |
| 2,469,600 A * | 5/1949 | Jordan | ............... | 269/180 |
| 2,785,709 A * | 3/1957 | Shepp | ............... | 83/435.14 |
| 2,998,813 A * | 9/1961 | Wilson | ............... | 83/435.14 |
| 3,083,744 A * | 4/1963 | Vold | ............... | 83/435.12 |
| 4,346,636 A * | 8/1982 | Taylor | ............... | 83/767 |

(Continued)

FOREIGN PATENT DOCUMENTS

EP 1 223 012 A1 7/2002

(Continued)

*Primary Examiner*—Jason Prone
(74) *Attorney, Agent, or Firm*—Adan Ayala

(57) ABSTRACT

The present invention is directed to a method and system for providing workpiece positioning for power tools, such as miter saws. The apparatus includes an adjustable positioning device such as a threaded rod. A retention member is connected to the adjustable positioning device. The retention member is capable of pivotally obtaining an extended orientation and a retracted orientation to alternatively contact a workpiece disposed on the power tool deck and to retract into an unobtrusive storage orientation. The apparatus of the present invention allows for proper positioning while permitting ease of use and storage.

23 Claims, 8 Drawing Sheets

U.S. PATENT DOCUMENTS

| | | | |
|---|---|---|---|
| 4,423,860 A * | 1/1984 | Windstrup | 269/180 |
| 4,608,900 A * | 9/1986 | Guiu et al. | 83/766 |
| 4,693,158 A * | 9/1987 | Price | 269/303 |
| 4,875,399 A * | 10/1989 | Scott et al. | 83/581 |
| 4,934,678 A * | 6/1990 | Bernier | 269/303 |
| 5,146,832 A * | 9/1992 | Wilson et al. | 83/684 |
| 5,239,905 A | 8/1993 | Dunn | 83/459 |
| 5,297,463 A | 3/1994 | O'Banion et al. | 83/468.3 |
| 5,443,554 A * | 8/1995 | Robert | 269/304 |
| 5,483,858 A * | 1/1996 | Chen | 83/581 |
| 5,564,323 A | 10/1996 | Sasaki et al. | 83/471.3 |
| 5,720,096 A | 2/1998 | Dorsey | 29/559 |
| 5,730,434 A | 3/1998 | Schoene et al. | 269/88 |
| 5,752,422 A | 5/1998 | Inoue et al. | 83/468.3 |
| 5,755,148 A | 5/1998 | Stumpf et al. | 83/468.2 |
| 5,768,966 A | 6/1998 | Duginske | 83/468.7 |
| 5,819,623 A | 10/1998 | Sasaki et al. | 83/468.2 |
| 5,957,022 A | 9/1999 | Stumpf et al. | 83/468.2 |
| D420,021 S | 2/2000 | Higuchi et al. | D15/133 |
| 6,073,529 A * | 6/2000 | Shibata et al. | 83/468.5 |
| D430,176 S | 8/2000 | Tuttle | D15/133 |
| 6,334,380 B1 | 1/2002 | Huang | 83/471.2 |
| 6,418,830 B1 | 7/2002 | Stumpf et al. | 83/468.2 |
| 6,481,320 B1 | 11/2002 | McGrory et al. | 83/13 |
| 6,543,323 B2 | 4/2003 | Hayashizaki et al. | 83/466 |
| 6,775,917 B1 * | 8/2004 | Campbell | 83/435.13 |
| 6,848,350 B2 * | 2/2005 | Brazell et al. | 83/435.11 |
| 7,156,008 B2 * | 1/2007 | Talesky | 83/468.6 |
| 2002/0100350 A1 | 8/2002 | Brazell | 83/438 |
| 2003/0217629 A1 | 11/2003 | Chen | 83/471.3 |
| 2006/0081105 A1 * | 4/2006 | Hines | 83/581 |
| 2006/0101971 A1 * | 5/2006 | Roe | 83/581 |

FOREIGN PATENT DOCUMENTS

JP   2003-211402 A   5/2002

* cited by examiner

ADJUSTABLE CLEAT

CROSS REFERENCE

The present application is a Continuation under 35 U.S.C. §120 of U.S. patent application Ser. No. 10/601,328, entitled Adjustable Cleat, filed on Jun. 20, 2003 now abandoned, which in-turn claims priority under 35 U.S.C. § 119(e) to U.S. Provisional Patent Ser. No. 60/390,552, entitled: Adjustable Cleat, filed on Jun. 21, 2002, both of which are hereby incorporated by reference in their entirety.

FIELD OF THE INVENTION

The present invention relates to the field of power tools and particularly to a method and an apparatus for adjustable workpiece positioning.

BACKGROUND OF THE INVENTION

Accurate, repeatable workpiece positioning is critical to the overall level of craftsmanship for woodworkers. In some instances, an imprecise cut may require additional sanding which is time consuming. For certain tasks, such as cutting a beveled miter joint, an imprecise cut may effect the appearance of the finished product or require the user to re-cut the workpiece. Often woodworkers will conduct test cuts to ensure a correct fit or "work-up" to their final cut. These techniques are time consuming and may diminish user satisfaction. For example, positioning a piece of trim molding at the proper angle with respect to the miter saw fence for cutting may be difficult or time consuming, especially for a novice user. Additionally, another drawback to current positioning mechanisms is the difficulty in set-up and removal after use.

For example, a woodworker may use a C-clamp to position a piece of trim to a miter saw's fence. Thus, the user must retrieve the clamp, and subsequently remove the clamp after use. In another example, a positioning device such as a clamp is mounted integral to the power tool. Once again the user must remove the device should they desire to cut a large piece of wood or when additional deck space is required. Current positioning mechanisms for power tools fail to provide ease of use.

Workpiece positioning systems often are cumbersome. For example, even if the built-in clamp provides enough room for the desired workpiece the clamp often is in the user's way, such as by protruding into the operator area or the like. Positioning mechanisms when removed often take up space or require the user to place the device in a remote portion of the work space so as not to interfere with the desired task. Current integral securing mechanisms are cumbersome when in use or removed and thus does not meet user demands.

Another problem with integral positioning mechanisms is the inability to retrofit with existing power tools. For example, current positioning mechanisms are typically designed for a specific tool or for a specific manufacturer, thus a retrofit is often not possible.

Therefore, it would be desirable to provide an unobtrusive workpiece positioning apparatus capable of securing a workpiece while providing ease of use.

SUMMARY OF THE INVENTION

Accordingly, the present invention is directed to an apparatus and method for providing workpiece positioning for power tools such as miter saws, drill presses, mortise machines and the like. As will be appreciated the present invention allows for correct workpiece positioning while permitting easy unobtrusive storage.

The apparatus of the present invention includes an adjustable positioning device, such as a threaded rod. The adjustable positioning device may be mounted in a housing or power tool work deck. The positioning device is disposed in a housing recess, such that the apparatus does not interfere with positioning a workpiece.

Adjustably connected to the positioning device is a retention member. A retention member provides a cleat or stop for retaining a workpiece in a desired position. The retention member may pivot to achieve an extended orientation, such as beyond an external surface of the housing and a retracted orientation substantially contained within the housing recess.

A securing member is connected to the retention member. Securing members include, deformable tabs, spring biased devices such as tabs, buttons and the like for securing the retaining member in a desired orientation.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
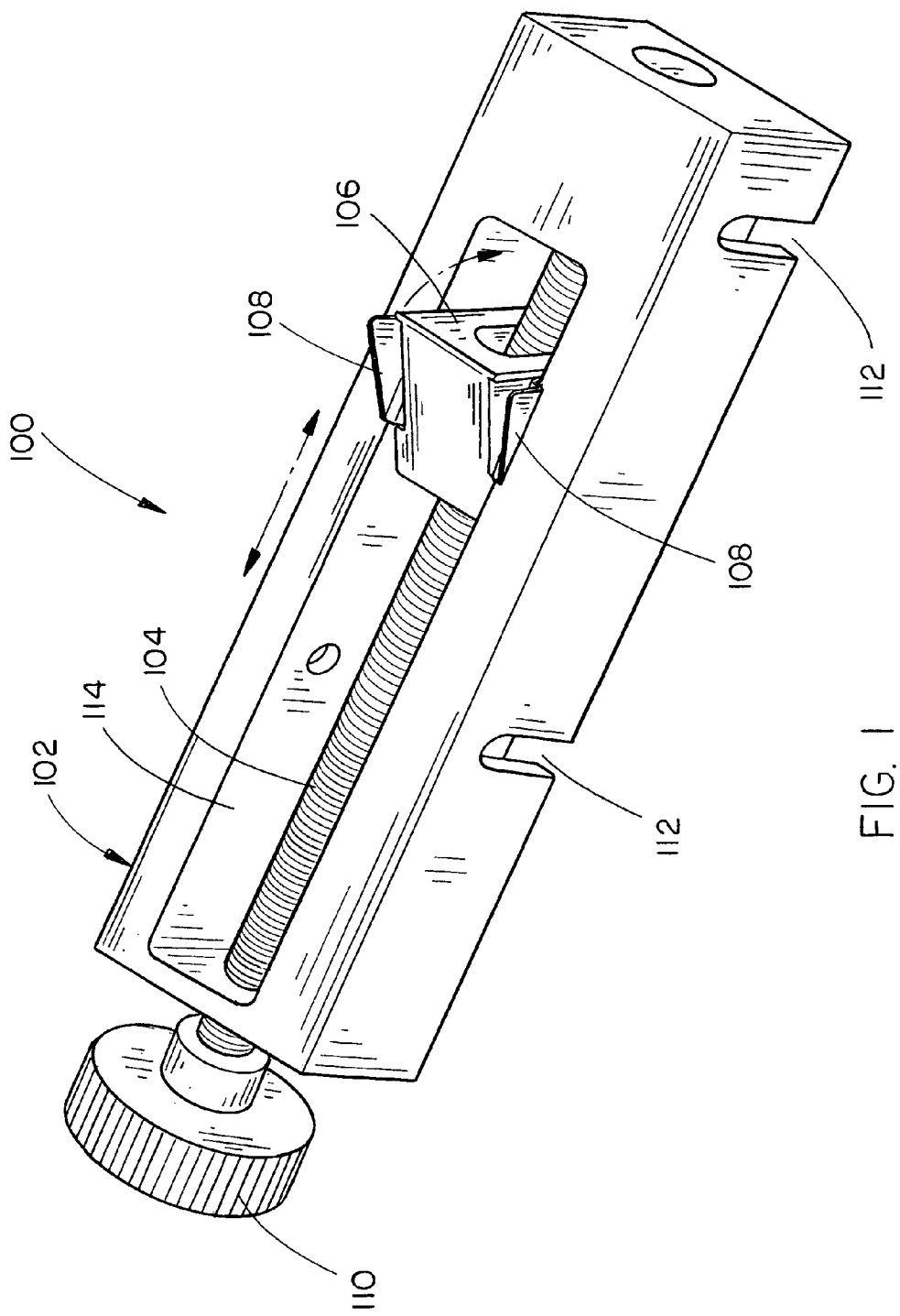
FIG. 1 is an isometric view of an apparatus for providing workpiece positioning with a retention member.

Regarding FIG. 1–6B, it is to be appreciated, that while the drawings are not formally related as showing alternate views, corresponding reference numbers are utilized for generally corresponding structures. Referring to FIG. 1 an apparatus 100 for providing workpiece positioning is shown. The apparatus 100 in the present embodiment includes a housing 102. The housing 102 permits connection to a power tool deck, such as the deck of a miter saw, a drill press deck and the like. The housing 102 includes a recess 114 generally for mounting apparatus components. Those of ordinary skill in the art will appreciate that the present invention may be incorporated in a power tool deck and the like without departing from the spirit of the present invention. For example, a drill press may include a work deck containing the apparatus of the present invention.

An attachment device is connected to the housing for securing the apparatus 100 to, for example a miter saw deck. Attachment devices permit connecting the apparatus 100 to a work surface, thus providing additional work area while permitting secure workpiece positioning. In the present embodiment, a pair of slots 112 for receiving a screw, a pin, or the like is shown. In further embodiments, other attachment devices are contemplated, such as to permit retrofitting the present invention to a particular tool.

An adjustable positioning device is connected to the housing and is disposed generally in the housing recess 114. A threaded rod 104 is utilized as an adjustable positioning device in the present embodiment. In further embodiments, other positioning devices are utilized, such as an advancing bar and friction stop, and the like for providing adjustable positioning. In another example the retention member is fitted with a friction lock so as to allow the retention member to adjust along a bar, a rod and the like for allowing movement along an axis. The threaded rod 104 is mounted to the housing 102, substantially within the housing recess 114 and may be actuated by a user manipulating a knob 110 secured to an end of the rod 104.

Figure 2A:
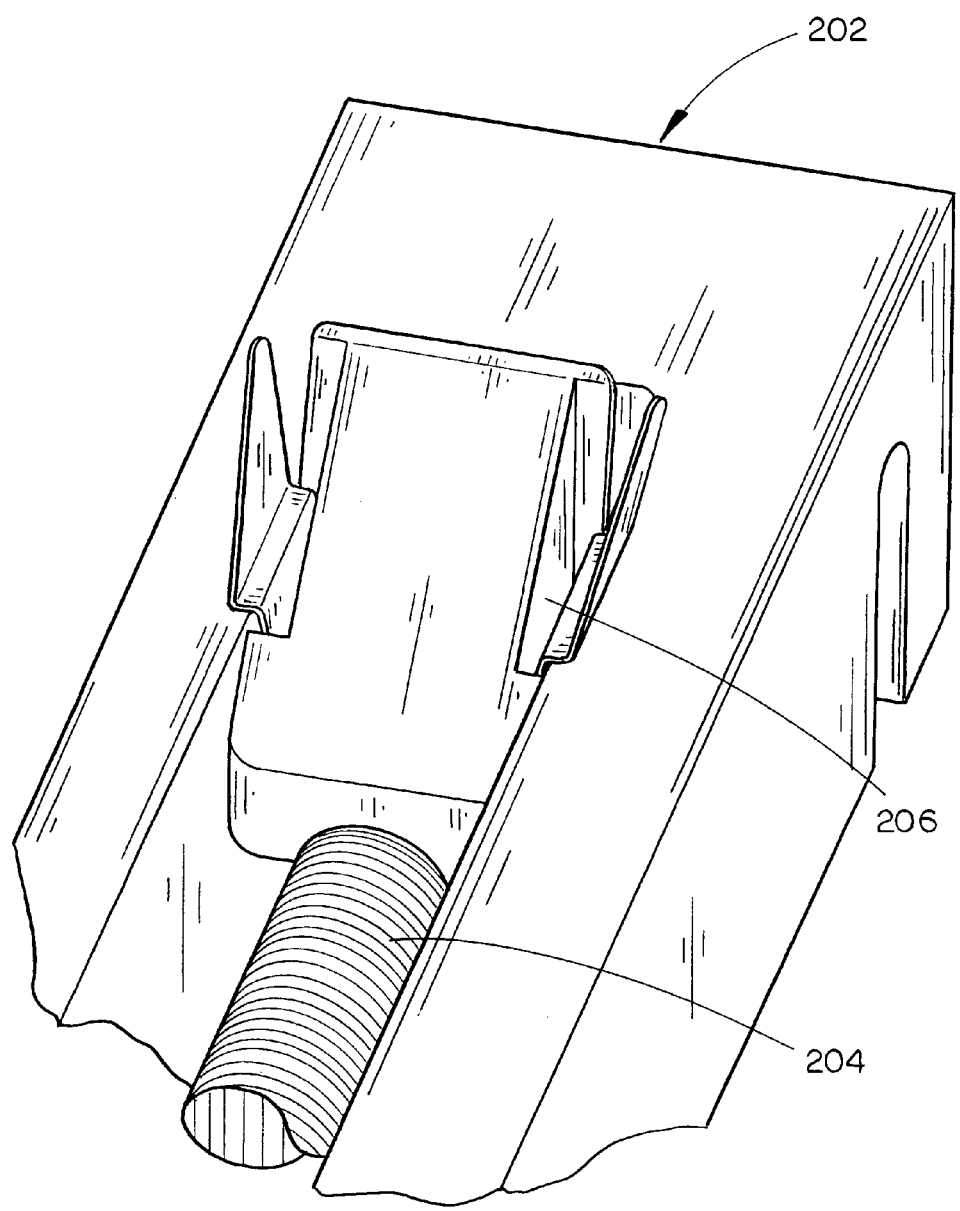
FIG. 2A is a perspective view of an apparatus for providing workpiece positioning, including a retention member orientated in an extended orientation.
Figure 2B:
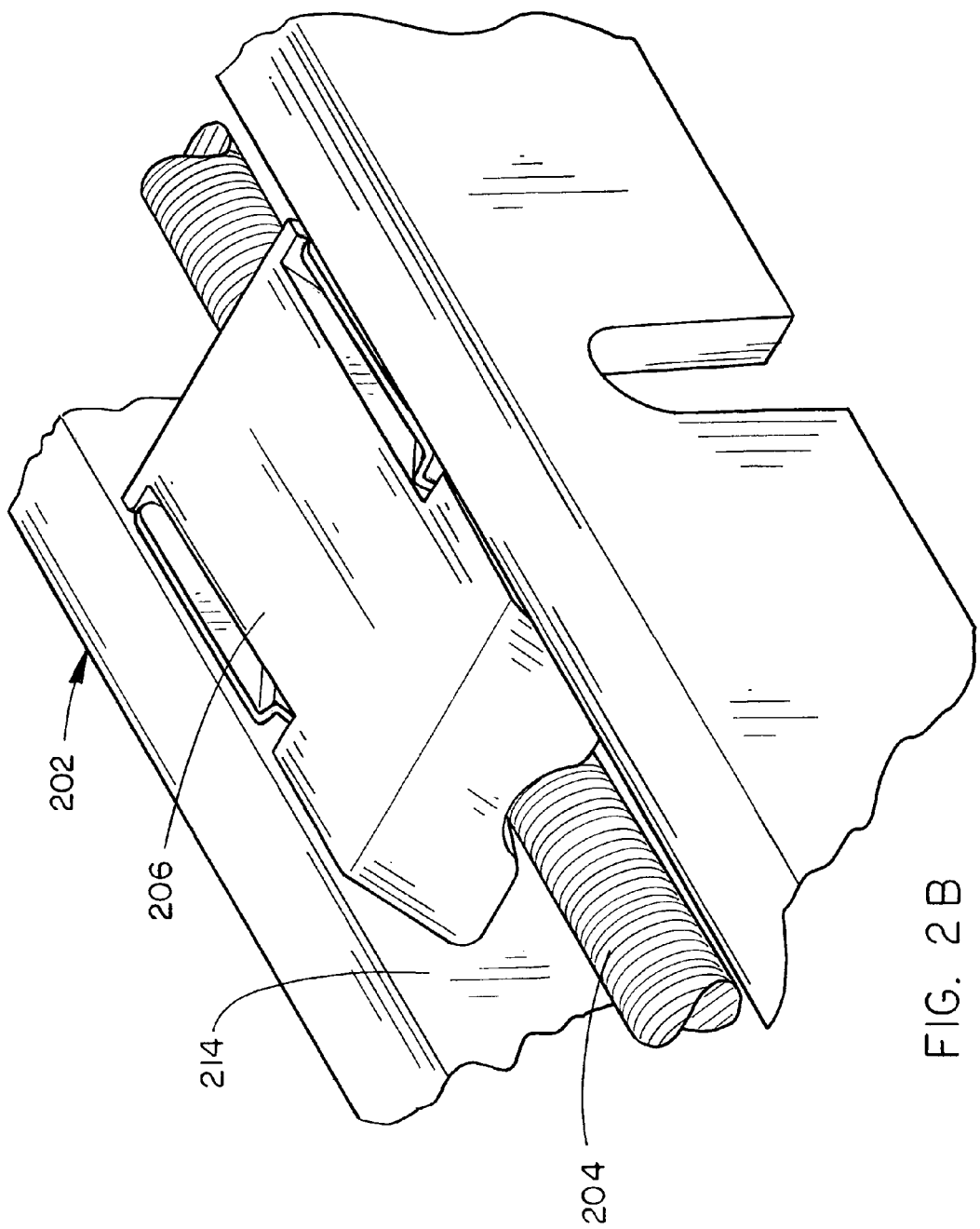
FIG. 2B is a perspective view of an apparatus for providing workpiece positioning, including a retention member orientated in a retracted orientation.

A retaining member 106 is adjustably connected to the threaded rod 104. As may be seen in FIG. 4 the retaining member 406 provides a stop or cleat for retaining a workpiece, such as a piece of molding 420 in a desired position. Referring now to FIGS. 2A and 2B the retaining member 206 is adjustably connected to the threaded rod 204. The retention member 206 is capable of pivotally obtaining an extended orientation, beyond an exterior surface of housing 202 and a retracted orientation (see FIG. 2B), wherein the retention member 206 is contained substantially within housing recess 214.

Referring to FIG. 1 a securing mechanism is connected to a retention member 106. A pair of deformable tabs 108 are utilized to secure the retention member 106 in at least one of a extended orientation and a retracted orientation. Deformable tabs 108 are capable of being squeezed inwardly towards the retention member 106 and upon release springing outwardly from the retention member 106. The deformable tabs 108 in the present example are capable of extending outwardly from the retention member 106 to engage an outer surface of a housing 104. The tabs 108 in the present embodiment may be formed of metal plastic, such as nylon and the like. Alternatively, when a user desires to dispose the retention member 106 in a retracted orientation the deformable tabs 108 may be disengaged and pivoted, along with the retention member 106 generally into the housing recess 114. See generally FIG. 2B. As may be best seen in FIG. 3, a retention member 306 includes relief areas to permit the tabs 308 to move inwardly to allow for pivoting the retention member 306 into a housing recess.

Figure 6A:
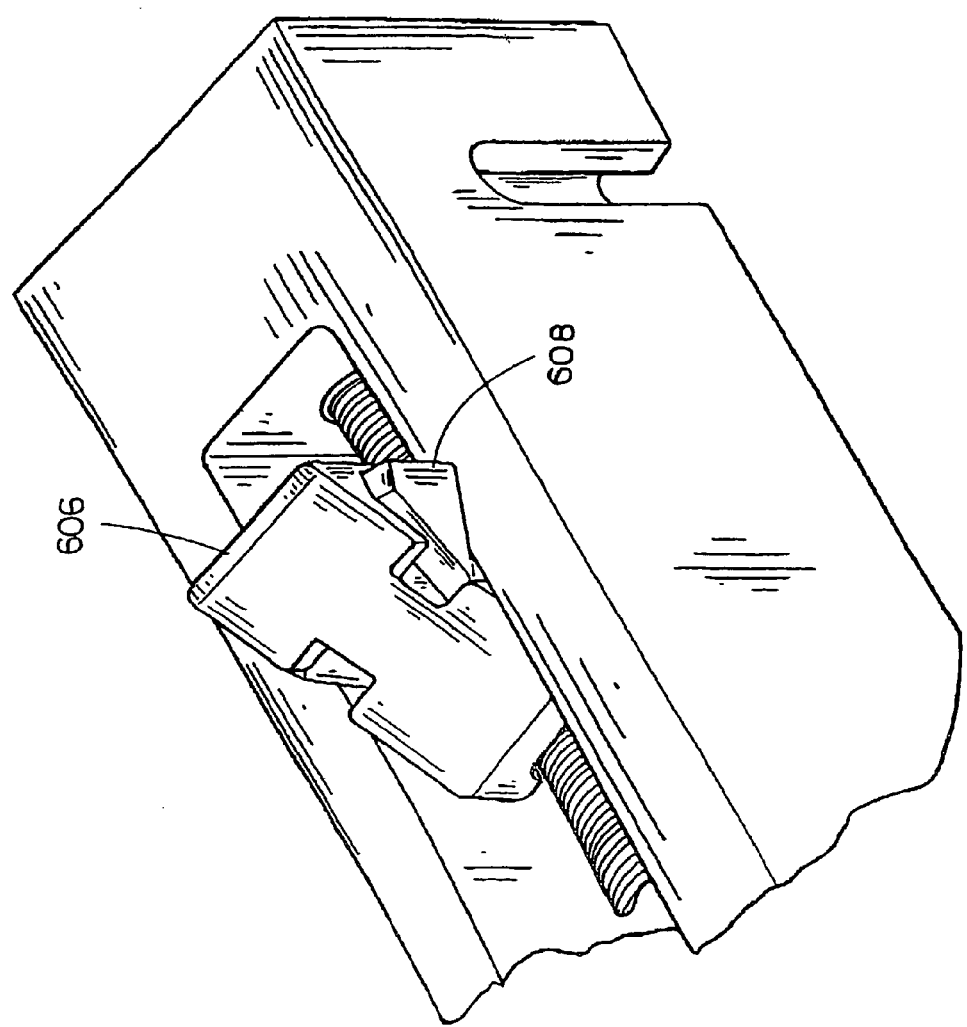
FIG. 6A is an perspective view of a retention member in an extended orientation with pivotal securing tabs.
Figure 6B:
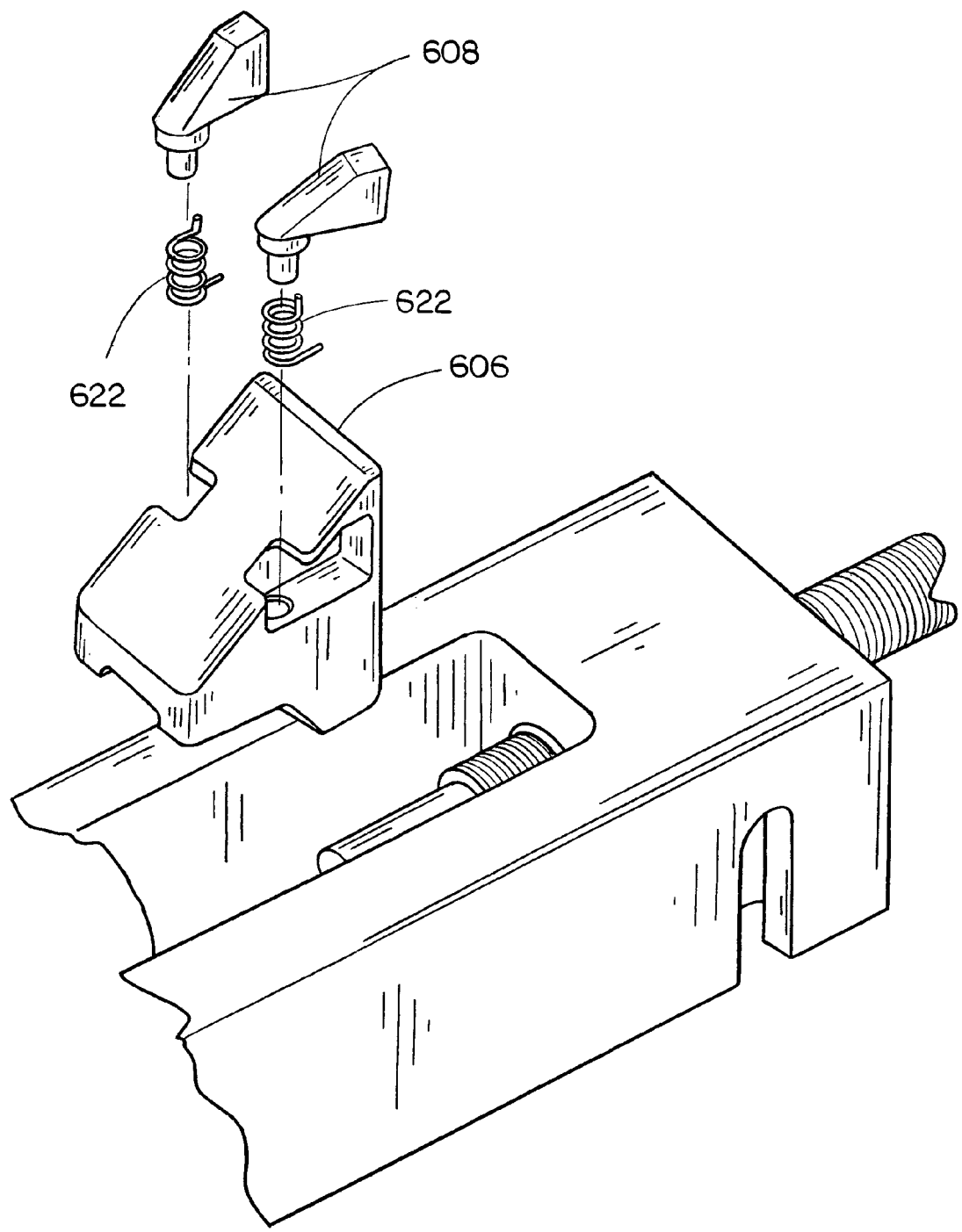
FIG. 6B is an exploded view of a retention member with pivotal securing tabs.

Referring to FIGS. 6A and 6B in a further embodiment a securing mechanism is a pair of pivotal tabs 608. The pivotal tabs are mounted generally in a recess formed in the retention member 606. As desired a user may pivot the tab 608 outwardly to engage the housing or deck. The pivotal tabs 608 may be formed of metal, plastic such as nylon and the like. Further, the retention member 606 may include an aperture extending between the side recesses with a spring therein for extending the pivotal tabs generally outward.

Those of skill in the art will appreciate that various biasing means may be employed to bias the pivotal tabs outward. For instance a coiled spring 622 may be utilized to bias the tab 608.

Figure 3:
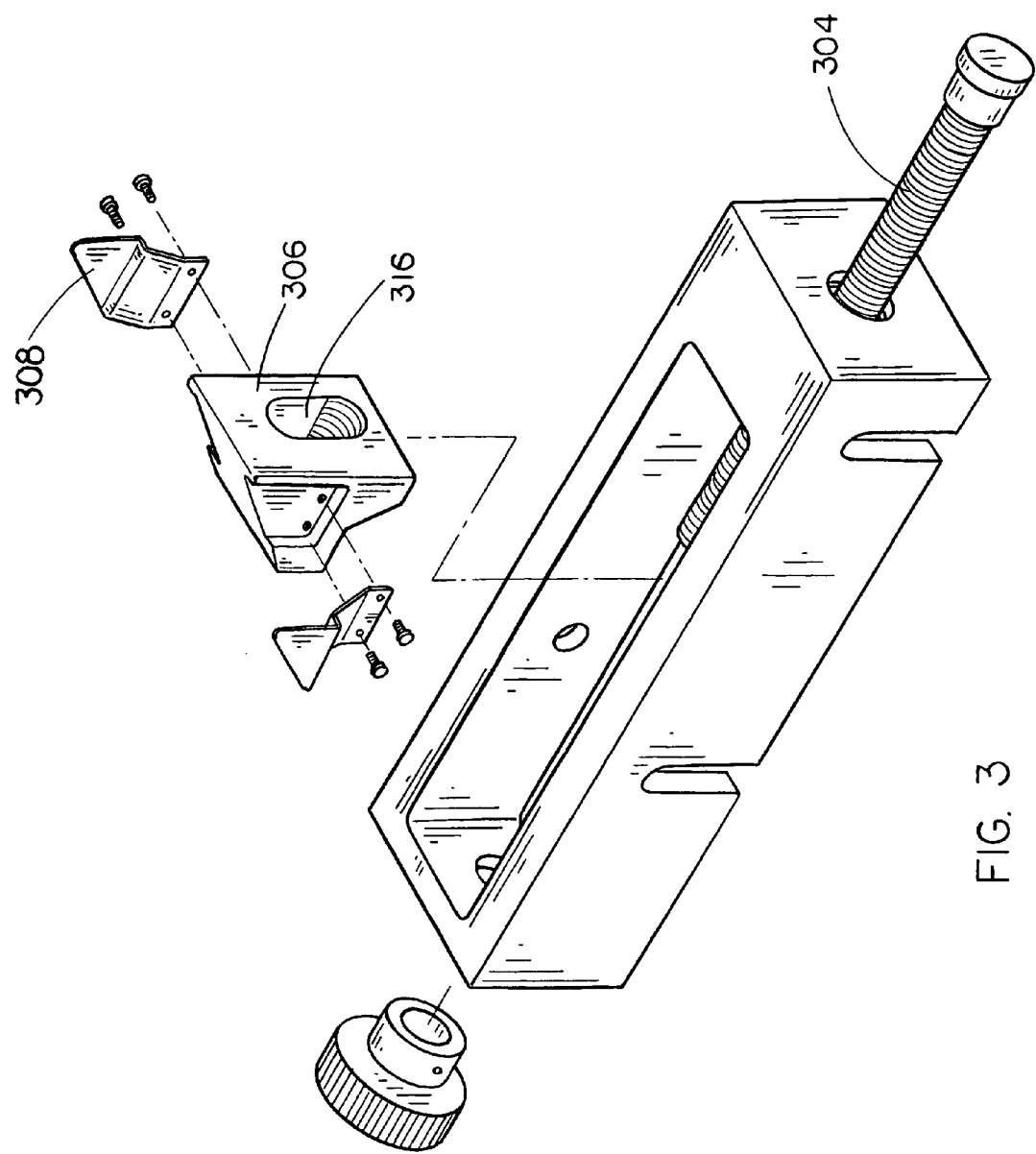
FIG. 3 is an exploded view of an apparatus for providing workpiece positioning including a threaded rod and a threaded segmented retention member.
Figure 4:
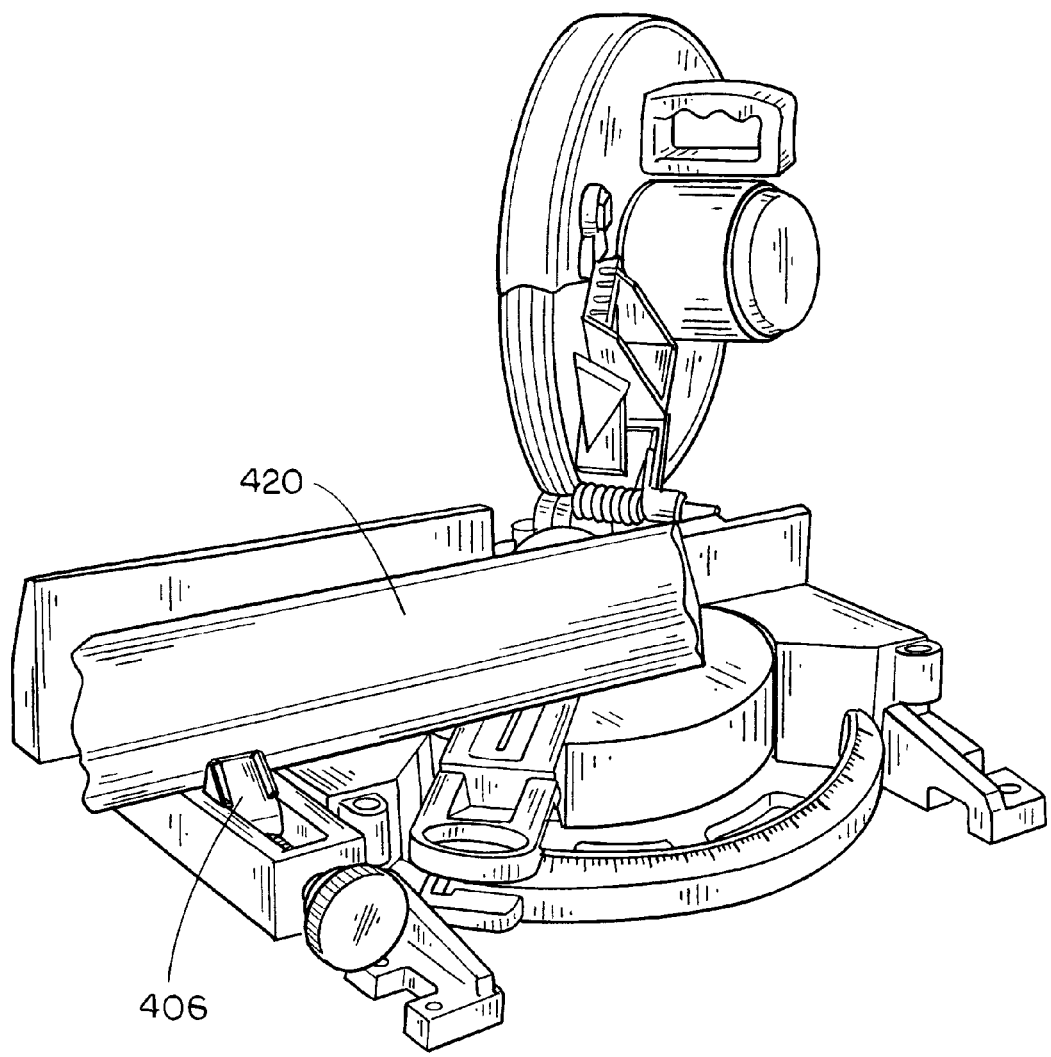
FIG. 4 is a perspective view of an apparatus for providing workpiece positioning for miter sawing.

Referring to FIG. 3, a retention member 306 includes an aperture 316 with segmented threads for engaging threads included on a threaded rod 304, thus the retention member 306 is capable of pivotally attaining an extended orientation and a retracted orientation. In further embodiments, a retention member pivots about a cylindrical pivot containing an aperture there through with threads for engaging corresponding threads on a threaded rod. In the further embodiment, the retention member main body includes a jacket for at least partially surrounding the cylindrical pivot, thus permitting extending and retracting the retention member. Those of ordinary skill in the art will appreciate that other systems for providing pivoting capability may be implemented without departing from the spirit of the present invention.

In further embodiments securing mechanisms include spring biased devices, such as tabs, buttons and the like for securing a retention member in a desired orientation. Those of ordinary skill in the art will appreciate that many securing mechanisms may be employed to secure the retention member in a desired orientation, without departing from the spirit and scope of the present invention.

Figure 5:
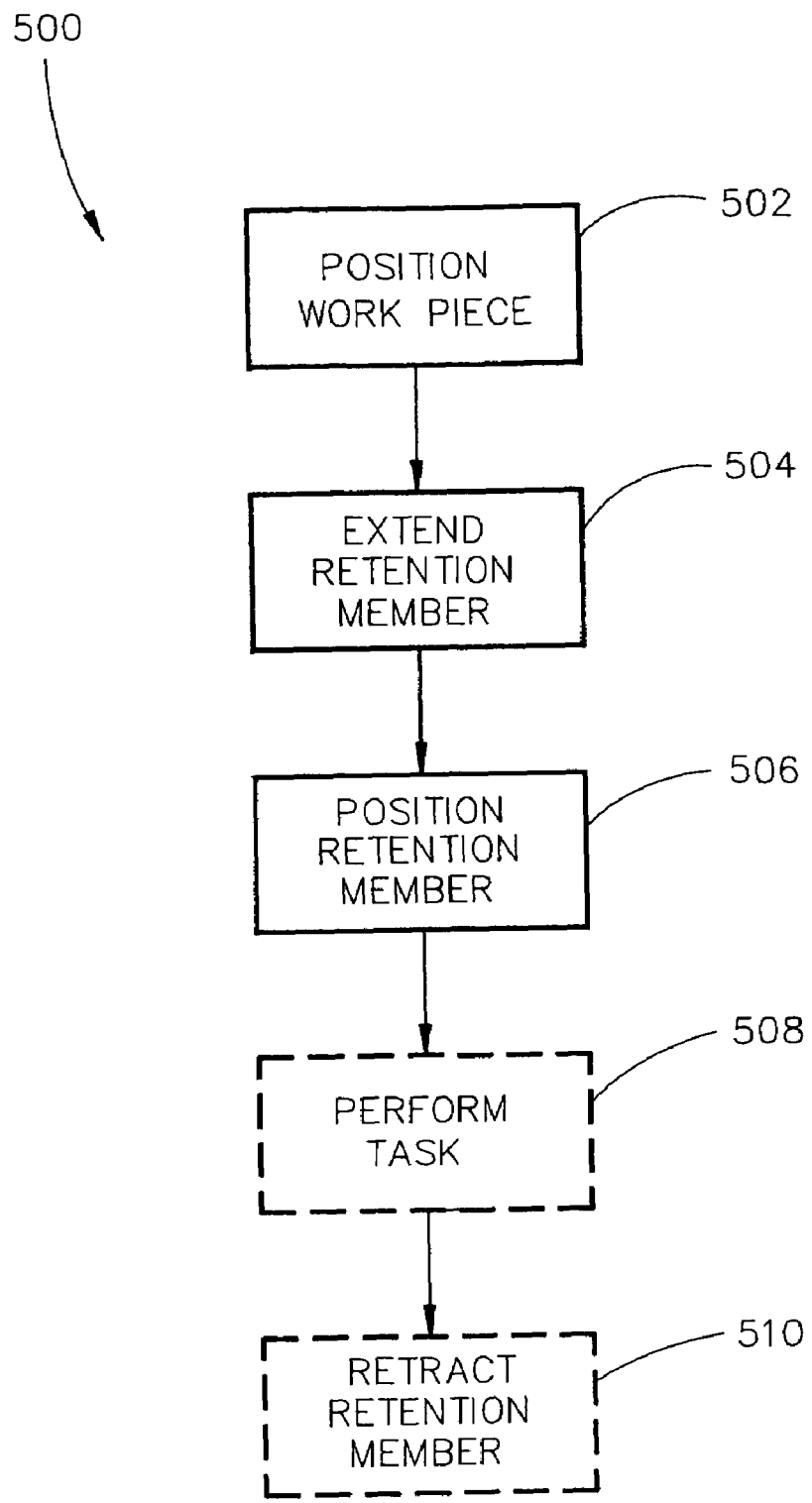
FIG. 5 is a flow diagram illustrating a method for providing workpiece positioning.

Referring now to FIG. 5 a method 500 for providing retractable workpiece positioning for power tools is discussed. Initially, a workpiece such as a piece of trim or the like is positioned on the power tool deck 502. The retention member is orientated into an extended orientation 504 so that the retention member provides a cleat or stop for positioning the workpiece. Extending the retention member 504 may include orientating the retention member such that securing mechanism, for example deformable tabs engage an exterior surface of an associated housing or tool deck. The retention member's position is adjusted 506 by directing the adjustable positioning device to the desired position. The desired task is performed 508, such as cutting a trim piece. Optionally, the retention member may be retracted 510 for example by actuating the securing mechanism and pivoting the retention member below the work surface.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the retractable positioning apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus for providing workpiece positioning, comprising:

a deck for supporting a workpiece;

an adjustable positioning device disposed within the deck;

a retention member connected to the adjustable positioning device for providing workpiece positioning, the retention member having a workpiece-contacting surface; and a securing mechanism connected to the retention member, for securing the retention member in a desired orientation;

wherein the retention member is capable of pivotally obtaining an extended orientation exterior to the deck and a substantially retracted orientation substantially refracted into the deck for storage, the workpiece-contacting surface being completely below the deck when the retention member is in the retracted position, and the retention member being movable relative to the deck along a direction substantially parallel to the deck when the retention member is in the extended orientation, wherein the retention member pivots about an axis substantially perpendicular to the direction.

2. The apparatus of claim 1, wherein an adjustable positioning device is a threaded rod.

3. The apparatus of claim 2, wherein the retention member includes an aperture with segmented threads for pivotally engaging the threaded rod.

4. The apparatus of claim 1, wherein the securing mechanism is a pair of spring biased tabs.

5. The apparatus of claim 1, wherein the securing mechanism is a pair of generally opposing deformable tabs.

6. The apparatus of claim 1, wherein the securing mechanism is a pair of pivotal tabs.

7. The apparatus of claim 1, wherein the apparatus is integrated with a power tool.

8. An apparatus for providing retractable workpiece positioning, comprising:

a housing including a support surface for supporting a workpiece, the support surface having a recess therein;

an adjustable positioning device disposed generally in the housing recess;

a retention member adjustably connected to the adjustable positioning device, said retention member, being configured to pivotally obtain an extended orientation and a retracted orientation for providing workpiece positioning, the retention member having a workpiece-contacting surface; and a securing mechanism connected to the retention member, for securing the retention member in at least one of the extended orientation and the retracted orientation;

wherein the retention member is capable of pivotally extending exterior to the housing and retracting substantially below the support surface, the workpiece-contacting surface being completely below the support surface when the retention member is in the retracted position, and the retention member being movable relative to the support surface along a direction substantially parallel to the support surface when the retention member is in the extended orientation, wherein the retention member pivots about an axis substantially perpendicular to the direction.

9. The apparatus of claim 8, wherein further comprising an attachment device connected to the housing for attaching the apparatus to a deck.

10. The apparatus of claim 8, wherein the adjustable positioning device is a threaded rod.

11. The apparatus of claim 10, wherein the retention member includes an aperture with segmented threads for engaging the threaded rod.

12. The apparatus of claim 8, wherein the securing mechanism is a pair of spring biased tabs.

13. The apparatus of claim 8, wherein the securing mechanism is a pair of generally opposing deformable tabs.

14. The apparatus of claim 8, wherein the securing mechanism is a pair of pivotal tabs.

15. The apparatus of claim 8, wherein the housing is included in a work deck.

16. The apparatus of claim 8, wherein the apparatus is integrated with a power tool.

17. An apparatus for workpiece positioning, comprising:

a support surface for supporting a workpiece;

means for adjustable positioning;

means for retaining a workpiece in a desired position, the retaining means having a workpiece-contacting surface; and means for securing the retaining means, the securing means being capable of securing the retaining means in a desired orientation;

wherein the retaining means is capable of obtaining an extended orientation disposed substantially above the support surface and a substantially retracted orientation disposed below the support surface, the workpiece-contacting surface being completely below the support surface when the retention means is in the retracted position, and the retention means being movable relative to the support surface along a direction substantially parallel to the support surface when the retention means is in the extended orientation, wherein the retention member pivots between the extended and retracted orientations about an axis substantially perpendicular to the direction.

18. The apparatus of claim 17, wherein the adjustable positioning means is a threaded rod.

19. The apparatus of claim 17, wherein the retaining means is adjustably connected to the adjustable positioning means.

20. The apparatus of claim 17, wherein the retaining means is a cleat.

21. The apparatus of claim 17, wherein the securing means is a pair of spring biased tabs.

22. The apparatus of claim 17, wherein the securing means is a pair of deformable tabs.

23. An apparatus for providing workpiece positioning, comprising:

a support surface for supporting a workpiece;

an adjustable retention member having a workpiece-contacting surface; and a securing mechanism, connected to the retention member, the securing mechanism being constructed for securing the retention member in a desired orientation;

wherein the retention member is capable of pivotally obtaining an extended orientation disposed substantially above the support surface and a retracted orientation disposed below the support surface, the workpiece-contacting surface being completely below the support surface when the retention member is in the refracted position, and the retention member being movable relative to the support surface along a direction substantially parallel to the support surface when the retention member is in the extended orientation, wherein the retention member pivots about an axis substantially perpendicular to the direction.

* * * * *